United States Patent Office 3,518,251
Patented June 30, 1970

3,518,251
CERTAIN AMINOALKYLAMINO SUBSTITUTED
AZACYCLOALKENES
Karl Gatzi, Basel, Switzerland, assignor to
J. R. Geigy, Basel, Switzerland
No Drawing. Continuation-in-part of application Ser. No.
290,343, June 25, 1963. This application June 7, 1967,
Ser. No. 644,078
Int. Cl. C07d 27/14, 29/38, 41/08
U.S. Cl. 260—239          8 Claims

ABSTRACT OF THE DISCLOSURE

Fungicidal heterocyclic amines of the formula

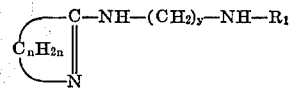

wherein:

$n$ is a whole number from 3 to 15,
$y$ is a whole number from 2 to 6, and
$R_1$ represents hydrogen or alkyl, cycloalkyl, aryl or aralkyl radicals or heterocyclic radicals, as well as fungicidally effective salts of such amines with organic or inorganic acids, and their quaternary salts, and fungicidal compositions containing such novel compounds.

CROSS REFERENCE TO RELATED APPLICATIONS

This application is a continuation-in-part of our pending application Ser. No. 290,343, filed June 25, 1963, now U.S. Pat. 3,378,438, granted Apr. 16, 1968, which is in turn a continuation-in-part of our patent application Ser. No. 290,308, filed on June 25, 1963, now Pat. No. 3,255,181, granted June 7, 1966.

DESCRIPTION OF THE INVENTION

This invention relates to certain heterocyclic amines possessing fungicidal activity, or compositions containing these amines as active ingredients, which are useful in controlling the growth of fungi by application of such compounds or compositions to the fungi or the substrate on which they grow.

It has been found that certain heterocyclic amines falling under the formula

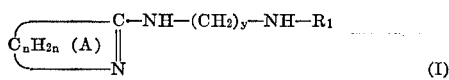
(I)

wherein:

$R_1$ represents hydrogen, an alkyl, cycloalkyl, aryl or aralkyl radical which is unsubstituted or substituted, or a heterocyclic radical, all radicals being defined more specifically below, and wherein:

$y$ represents a whole number of 2 to 6, and
$n$ represents a whole number from 3 to 15, from 3 to not more than 7 of the carbon atoms of $C_nH_{2n}$ being ring members of ring A, their salts, with inorganic and organic acids, as well as their quaternary salts, have excellent fungicidal properties.

Compounds of Formula I are obtained by reacting equivalent amounts of a lactim ether of the formula

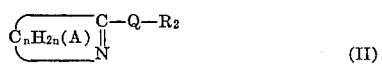
(II)

wherein:

$R_2$ represents a lower alkyl radical having 1 to 3 carbon atoms,
Q represents oxygen or sulfur, and
$n$ has the above given meaning, preferably in the presence of an organic solvent and of a tertiary amine as catalyst, with a primary amine of the formula $$NH_2-(CH_2)_y-NH-R_1 \qquad (III)$$

wherein $y$ and $R_1$ have the meanings given above. As organic solvents, e.g. aromatic hydrocarbons, alcohols, esters, ketones, ethers, etc. are used.

Examples of tertiary amines are pyridine, trimethylamine, triethylamine, triethanolamine, etc. In the reaction, the radical —$QR_2$ is split off and an alcohol or mercaptan is formed.

By the term "salts" are meant salts of inorganic and organic acids as well as the quaternary salts. The salts of inorganic and organic acids with compounds of Formula I are obtained by reacting, optionally in the presence of neutral organic solvents or of water, the reaction products obtained by the process described with equivalent amounts of an inorganic or organic acid such as hydrochloric acid, sulfuric acid, phosphoric acid, formic acid, acetic acid, propionic acid, sorbic acid, oxalic acid, succinic acid, phthalic acid, p-toluene sulfonic acid, lauryl sulfuric acid, lauric acid, and others.

The quaternary salts are obtained by reacting equivalent amounts of compounds of Formula I with conventional quaternising agents, e.g. reactive esters of sulfuric acid and toluene sulfonic acid, or reactive derivatives of alcohols, e.g. methyl iodide, butyl bromide or benzyl chloride. This reaction may be performed in the presence of an organic inert solvent e.g. benzene, or of water.

By the symbol —$C_nH_{2n}$— in the Formulas I and II are meant alkylene radicals with from 3 to 15 carbon atoms which may be substituted by branched or straight chain alkyl radicals, but of which from 3 to not more than 7 carbon atoms are ring members of ring A.

More specifically, $R_1$ in Formula I represents hydrogen, alkyl with from 1 to 15 carbon atoms, alkoxy-alkyl with from 3 to 15 carbon atoms, alkylthio-alkyl with from 3 to 15 carbon atoms, chloroalkyl with from 2 to 15 carbon atoms, bromo-alkyl with from 2 to 15 carbon atoms, phenyl, lower alkyl-phenyl, lower alkoxy-phenyl, chloro-phenyl, bromo-phenyl, phenyl-lower alkyl, lower cycloalkyl with from 5 to 7 carbon atoms, and lower alkyl, chloro-phenyl-lower alkyl, bromophenyl-lower alkyl, cycloalkyl with from 5 to 7 carbon atoms, and lower alkylcycloalkyl with from 5 to 7 ring carbon atoms; and, furthermore $\Delta^{1,5}$-azacyclopentenyl-(5), lower alkyl-$\Delta^{1,5}$-azacyclopentenyl-(5), $\Delta^{1,7}$-azacycloheptenyl-(7), lower alkyl-$\Delta^{1,7}$-azacycloheptenyl-(7), $\Delta^{1,9}$-azacyclononenyl-(9) and lower alkyl-$\Delta^{1,9}$-azacyclononenyl-(9).

"Lower" when used in connection with alkyl or alkoxy means a radical with from 1 to 4 carbon atoms.

The following examples describe the production of the active substances according to the invention. Parts are given therein as parts by weight unless stated otherwise and the temperatures are in degrees centigrade.

EXAMPLE 1

12.7 parts of O-methyl caprolactim [1] 17.2 parts of β-(n-octylamino)-ethylamine,[2] 200 parts by volume of ethanol and 1.0 part of triethylamine are refluxed for 20 hours. The main amount of the ethanol is then evaporated off in vacuo and the residue is taken up in ether and ---
[1] O-methyl caprolactim produced as described in Organic Synthesis, 31, 72 (1951).
[2] β-(n-Octylamino)-ethylamine produced as described by F. Linsker et al., J. Amer. Chem. Soc., 67 (1945), 1581.

washed with water. On evaporating the ether solution, the 7-[β-(n-octylamino) - ethylamine] - 3,4,5,6 - tetrahydro - 2H - azepine (i.e. 7-[O-(n-octylamino)-ethylamino]-$\Delta^{1,7}$ - azacycloheptene) obtained boils at 130–131° C. (0.01 torr).

EXAMPLE 2

On dissolving in the equivalent amount of dilute hydrochloric acid, the hydrochloride is obtained (recrystallized from water or acetone).

EXAMPLE 3

In an analogous manner, there are produced from 7-[β-(n-octylamino) - ethylamino] - 3,4,5,6 - tetrahydro-2H-azepine and the corresponding dilute acid the sulfate, nitrate, phosphate, formate, acetate, propionate, sorbate, oxalate, succinate, fumerate, phthalate, p-toluenesulfonate, benzoate, lauryl sulfate and laurate.

EXAMPLES 4 AND 5

14.3 parts of 2-methylthio - 3,4,5,6 - tetrahydro-2H-azepine, 200 parts by volume of benzene, 15.0 parts of γ-phenylamino - propylamine and 1 part of triethylamine are refluxed for 20 hours. The solution is concentrated in vacuo and the residue is recrystallized from petroleum ether; the 7-(γ-phenylamino - propylamino) - 3,4,5,6-tetrahydro-2H-azepine is then converted to the hydrochloride according to Example 1.

EXAMPLE 6

7 parts of 7-(γ-phenylamino - propylamino) - 3,4,5,6-tetrahydro-2H-azepine are dissolved in 100 parts by volume of anhydrous benzene, and 3.25 parts of dimethylsulfate are added drop by drop and the resulting mixture is then refluxed for one hour. On evaporating the benzene the quaternary 7-(γ-phenylamino - propylamino)-3,4,5,6 - tetrahydro-2H-azepine dimethylsulfate is obtained as water-soluble, viscous oil which decomposes upon distillation.

Further compounds of Formula I of which the data for $n$, $z$ which represents the number of carbon atoms being ring members in ring A besides the —C=N— grouping, the alkyl branching at ring A, if present, $y$, as well as $R_1$, are given in the table below, and salts and quaternary salts of these compounds of which the anion or quaternizing agent is also given below, are produced in the manner described in Examples 1 to 6 from equivalent amounts of the corresponding lactim ether of Formula II and the corresponding amine of Formula III.

The starting materials are either known or have been produced in a manner analogous to that of making the known starting materials.

EXAMPLES 34 AND 35

The two following compounds are obtained in the same manner as described in Examples 1 and 2 from enanth lactam and capryl lactam by reaction with β-(n-octylamino)-ethylamine and γ-phenylamino-propylamine respectively.

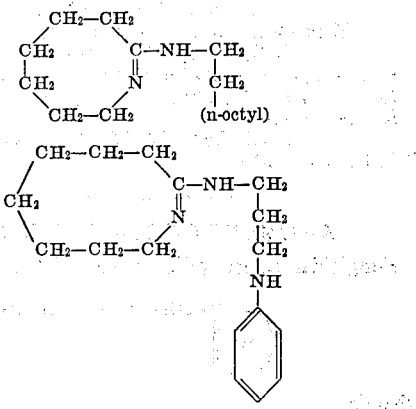

The compounds of the Formula I are suitable as active substances in fungicidal agents for the most various forms of application such as inhibition and repression of the growth of fungi on plants and parts thereof as well as the protection of organic materials of all types such as wood, textiles, furs, leather, paper, synthetic substances, etc. from attack and decomposition by fungi. For these purposes the active substances are employed in a finely distributed form as such or combined with suitable carriers and distributing agents. They can also be used in combination with other fungicidally active substances as well as with fungistatica and bacteriostatica. To increase the range of action, also insecticidally or nematocidally active substances, etc. can be added to the active substances used according to the invention.

To produce fungicidal agents according to the invention the active substances can be mixed, for example, with solid, pulverulent carriers such as, e.g. talcum, kaolin, loess, chalk or ground limestone. If desired, the pulverulent agents obtained can be made suspendable in water by the addition of suitable wetting and dispersing agents such as sulphite waste liquor. In addition, the active substances as such in solid, finely ground form, can be suspended in water with the aid of capillary active substances, or they can be emulsified in water, after dissolving them in organic solvents, with the aid of suitable emulsifying agents. Also, the active substances can be dissolved in organic solvents, e.g. in chlorinated hydrocarbons such as trichloroethylene, or in medium petrol-

| Ex. No. | $n$ | $z$ | Alkyl branching | $y$ | $R_1$ | Salt |
|---|---|---|---|---|---|---|
| 7 | 3 | 3 | | 3 | $\Delta^{1,5}$-azacyclopentenyl-(5) | |
| 8 | 5 | 5 | | 5 | Hydrogen | |
| 9 | 5 | 5 | | 5 | do | Tartrate. |
| 10 | 5 | 5 | | 2 | B-(n-hexyloxy)-ethyl | |
| 11 | 9 | 5 | 4-t-butyl | 2 | 4'-t-butyl-$\Delta^{1,7}$-azacycloheptenyl-(7) | |
| 12 | 5 | 5 | | 2 | p-Chloro-phenyl | |
| 13 | 5 | 5 | | 2 | B-(p-methyl-phenyl)-ethyl | |
| 14 | 5 | 5 | | 3 | m-methoxy-benzyl | |
| 15 | 5 | 5 | | 3 | 2,4-dibromo-benzyl | |
| 16 | 5 | 5 | | 3 | 3'-methyl-$\Delta^{1',5'}$n-azacyclopentenyl-(5') | |
| 17 | 5 | 5 | | 2 | n-Hexyl | |
| 18 | 5 | 5 | | 2 | $\Delta^{1,7}$-azacycloheptenyl-(7) | |
| 19 | 5 | 5 | | 3 | o-Chloro-phenyl | |
| 20 | 5 | 5 | | 3 | do | Acetate. |
| 21 | 5 | 5 | | 3 | m-Chloro-phenyl | Chloride. |
| 22 | 5 | 5 | | 4 | p-Chloro-phenyl | Benzoate. |
| 23 | 5 | 5 | | 6 | Methyl | |
| 24 | 5 | 5 | | 2 | n-Pentadecyl | |
| 25 | 9 | 5 | 4-isobutyl | 4 | Cycloheptyl | |
| 26 | 10 | 5 | 4-amyl | 2 | p-Bromophenyl | |
| 27 | 7 | 7 | | 2 | 6'-chloro-n-hexyl | |
| 28 | 7 | 7 | | 3 | o-Methoxy-phenyl | |
| 29 | 7 | 7 | | 3 | p-Chloro-benxyl | |
| 30 | 7 | 7 | | 2 | $\Delta^{1,9}$-azacyclononenyl-(9) | |
| 31 | 7 | 7 | | 3 | 5'-bromo-n-pentyl | |
| 32 | 7 | 7 | | 4 | 8'-ethyl-$\Delta^{1',9'}$-azacyclononenyl-(9') | |
| 33 | 8 | 7 | 5-methyl | 2 | o-Methyl-benzyl | | leum fractions, boiling range 100° to 200° possibly with the addition of auxiliary solvents such as acetone or higher ketones, e.g. cyclohexanone. Finally, the active substances can also be employed in the form of aerosols, smoke or mist, particularly in storerooms and greenhouses.

The fungicidal active substances are applied to an organic material to be protected generally either by admixture therewith, by spraying or by impregnating with organic-aqueous or aqueous solutions of the active substance which can contain the active substance in dispersion or suspension.

The following examples further illustrate the production of some fungicidal agents:

EXAMPLE I 20 parts of 7-[β-(n-octylamino)-ethylamino]-3,4,5,6-tetrahydro-2H-azepine produced as described in Example 1 are finely milled in a ball mill with 4 parts of a polyvinyl pyrrolidone dispersing agent and 76 parts of water. The paste so obtained is suspended in water and is used for the combatting of fungi, particularly in orchards.

EXAMPLE II 50 parts of 7-[β-(n-octylamino)-ethylamino]-3,4,5,6-tetrahydro-2H-azepine, produced as in Example 1, 2 parts of an adhesive having a polyvinyl alcohol base, 10 parts of sulphite waste liquor, 16 parts of champagne chalk, 20 parts of kaolin and 2 parts of a wetting agent having an alkyl and aryl sulphonate base as milled together, mixed, and again milled. A 50% wettable powder is obtained which can be suspended in water and is suitable in particular for use in fruit cultivation.

EXAMPLE III 10 parts of 7-(γ-phenylamino-propylamino)-3,4,5,6-tetrahydro-2H-azepine, produced as described in Example 4 are dissolved in 80 parts of dimethyl formamide, and 10 parts of an alkyl-aryl sulphonate are mixed into this solution until homogeneity is attained. In this way an emulsifiable solution is obtained which can be diluted to any concentration desired.

EXAMPLE IV 10 parts of 7-(γ-phenylamino-propylamino)-3,4,5,6-tetrahydro-2H-azepine, produced as described in Example 4, are dissolved in 15 parts of dimethyl sulphoxide and 65 parts of cyclohexanone. 10 parts of an alkylaryl polyethylene oxide (ratio 1:10) are mixed into this solution until homogeneity is attained. An emulsifiable solution is obtained which can be diluted to any concentration desired.

EXAMPLE V

The fungicidal activity of the compounds of Formula I was determined by the germination test with spores of the following types of fungi: *Alternaria tenuis, Botrytis cinerea, Clasterosporium c., Coniothyrium dipl., Fusarium culm.*, Mucor spec., Penicillium spec., and *Stemphyllium cons.*

A determined amount of a 1%, 0.1% and 0.01% solution of active substances in acetone was placed—all under equal conditions—in four petri dishes of identical size. The solvent was evaporated whereupon a level coating of active substance ready for inoculation was obtained in each of the four dishes. After inoculation, the dishes were kept for 168 hours at 20° C. in an atmosphere of 80% humidity. The germinated spores were then counted. The following table shows the values at which at least a 90% inhibition of germination was attained. The value "+" in the table represents at least a 90% inhibition of germination attained by the residue of one ml. of the aforesaid 1% solution of active substance in acetone (=13 mcg. active substance per cm.$^2$). "++" represents the same effect attained by the residue of one ml. of the aforesaid 0.1% solution, and "+++" the same effect attained with the residue of one ml. of 0.01% solution of active substance.

| | Alt. ten. | Botr. cin. | Clast. c. | Conj. dipl. | Fus. culm. | Muc. spec. | Pen. spec. | Stem. cons. |
|---|---|---|---|---|---|---|---|---|
| 7-[β-(n-octylamino)-ethylamino]-Δ$^{1,7}$-azacycloheptene (Example 1) | + | ++ | ++ | ++ | + | ++ | + | + |
| 7-{β-[Δ$^{1,7}$-azacyclohepteny-(7)-amino]-ethylamino}-Δ$^{1,7}$-azacycloheptene | + | ++ | | ++ | + | + | + | + |

I claim:
1. A compound selected from
   (a) a heterocycle of the formula

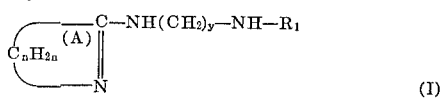

(b) a fungicidally effective salt of the compound of Formula I and an acid;

$R_1$ in Formula I representing hydrogen, alkyl with from 1 to 15 carbon atoms, alkoxyalkyl with from 3 to 15 carbon atoms, alkylthioalkyl with from 3 to 15 carbon atoms, chloroalkyl with from 3 to 15 carbon atoms, bromoalkyl with from 3 to 15 carbon atoms, phenyl, lower alkyl-phenyl, lower alkoxy-phenyl, chloro - phenyl, bromo - phenyl, phenyl - lower alkyl, lower alkyl-phenyl-lower alkyl, lower alkoxy-phenyl-lower alkyl, chloro-phenyl-lower alkyl, bromophenyl-lower alkyl, cycloalkyl with from 5 to 7 carbon atoms, lower alkylcycloalkyl with from 5 to 7 ring carbon atoms, Δ$^{1,5}$-azacyclo-pententyl-(5), lower alkyl-Δ$^{1,5}$-azacyclopentenyl-(5), Δ$^{1,7}$-azacycloheptenyl-(7), lower alkyl-Δ$^{1,7}$ - azacycloheptenyl - (7), Δ$^{1,9}$-azacyclononenyl-(9) or lower alkyl-Δ$^{1,9}$-azacyclononenyl-(9);

$y$ being an integer ranging from 2 to 6, and $n$ being an integer ranging from 3 to 15, from 3 to not more than 7 of the carbon atoms of grouping $C_nH_{2n}$ being ring members of ring A.

2. A compound as defined in claim 1, wherein said heterocycle is 7 - [β-(n-octylamino)-ethylamino] - 3,4,5,6-tetrahydro-2H-azepine.

3. A compound as defined in claim 1, wherein said heterocycle is 7-(γ - phenylamino - propylamino) - 3,4,5,6-tetrahydro-2H-azepine.

4. A compound as defined in claim 1, wherein said heterocycle is 7-{β-[β′-(n-hexyloxy) ethylamino]-ethylamino}-3,4,5,6-tetrahydro-2H-azepine.

5. A compound as defined in claim 1, wherein said heterocycle is 7-{β-[Δ$^{1,7}$ - azacycloheptenyl - (7) - amino]-ethyl-amino}-Δ$^{1,7}$-azacycloheptene.

6. A compound as defined in claim 1, wherein said heterocycle is 7-[β - (n - pentadecylamino) - ethylamino]-3,4,5,6-tetrahydro-2H-azepine.

7. A compound as defined in claim 1, wherein said heterocycle is 9-[γ-(p-chlorobenzylamino)-propylamino]-Δ$^{1,9}$-azacyclononene.

8. A compound as defined in claim 1, wherein said heterocycle is 9-{β - [Δ$^{1,9}$ - azacyclononenyl-(9) - amino]-ethylamino}-Δ$^{1,9}$-azacyclononene.

References Cited

FOREIGN PATENTS 1,078,568   3/1960   Germany.

ALTON D. ROLLINS, Primary Examiner

U.S. Cl. X.R.

260—326.9, 326.5, 296, 294.8; 424—244, 263, 274